(12) United States Patent
Takenaka et al.

(10) Patent No.: US 11,359,124 B2
(45) Date of Patent: *Jun. 14, 2022

(54) THERMALLY CONDUCTIVE POLYSILOXANE COMPOSITION

(71) Applicant: MOMENTIVE PERFORMANCE MATERIALS JAPAN LLC, Tokyo (JP)

(72) Inventors: Kenji Takenaka, Tokyo (JP); Atsushi Sakamoto, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 16/618,083

(22) PCT Filed: May 31, 2018

(86) PCT No.: PCT/JP2018/020905
§ 371 (c)(1),
(2) Date: Nov. 27, 2019

(87) PCT Pub. No.: WO2018/221637
PCT Pub. Date: Dec. 6, 2018

(65) Prior Publication Data
US 2020/0140736 A1 May 7, 2020

(30) Foreign Application Priority Data
May 31, 2017 (JP) .............................. JP2017-107607

(51) Int. Cl.
*C09K 5/14* (2006.01)
*C08L 83/04* (2006.01)

(52) U.S. Cl.
CPC ................ *C09K 5/14* (2013.01); *C08L 83/04* (2013.01); *C08L 2203/20* (2013.01); *C08L 2205/025* (2013.01); *C08L 2205/03* (2013.01)

(58) Field of Classification Search
CPC .... C09K 5/08; C09K 5/10; C09K 5/14; C08L 83/04; C08L 83/06; C08L 83/08; C08L 83/10; C08L 83/14; C08L 2203/20; C08L 2203/202; C08L 2203/204; C08L 2203/206; C08L 2205/025; C08L 2205/03; C08G 77/04; C08G 77/045; C08G 77/12; C08G 77/14; C08G 77/18; C08G 77/29; C08G 77/22
See application file for complete search history.

(56) References Cited

U.S. PATENT DOCUMENTS

| | | | |
|---|---|---|---|
| 5,021,494 A | 6/1991 | Toya | |
| 6,114,429 A * | 9/2000 | Yamada | C08L 83/04 252/512 |
| 6,169,142 B1 | 1/2001 | Nakano et al. | |
| 6,306,957 B1 | 10/2001 | Nakano et al. | |
| 7,141,273 B2 * | 11/2006 | Endo | C08L 83/04 427/387 |
| 7,279,224 B2 * | 10/2007 | Aoki | B32B 25/02 257/E23.107 |
| 7,692,032 B2 * | 4/2010 | Hoshino | C08L 83/06 556/450 |
| 8,802,763 B2 * | 8/2014 | Yamada | C09D 183/04 524/438 |
| 10,683,444 B2 | 6/2020 | Takanashi et al. | |
| 10,808,154 B2 * | 10/2020 | Gubbels | C08K 3/08 |
| 2002/0022127 A1 | 2/2002 | Katsuda et al. | |
| 2003/0229174 A1 | 12/2003 | Goto et al. | |
| 2005/0049357 A1 | 3/2005 | Zhong et al. | |
| 2007/0185259 A1 | 8/2007 | Hoshino | |
| 2010/0048435 A1 | 2/2010 | Yamagata et al. | |
| 2010/0140538 A1 * | 6/2010 | Sekiba | C08L 83/04 252/78.3 |
| 2011/0009544 A1 | 1/2011 | Funahashi | |
| 2016/0152794 A1 | 6/2016 | Diaham et al. | |
| 2017/0081578 A1 * | 3/2017 | Kato | H01L 23/42 |
| 2018/0134938 A1 | 5/2018 | Hirakawa et al. | |
| 2019/0161666 A1 | 5/2019 | Tanigawa et al. | |
| 2020/0123327 A1 | 4/2020 | Sakurai et al. | |

FOREIGN PATENT DOCUMENTS

| | | |
|---|---|---|
| CN | 1860181 A | 11/2006 |
| CN | 101641412 A | 2/2010 |
| EP | 3299420 A1 | 3/2018 |
| EP | 3575365 A1 | 12/2019 |

(Continued)

OTHER PUBLICATIONS

International Search Report (ISR) dated Jul. 3, 2018 (and English translation thereof), issued in International Application No. PCT/JP2018/020905.

Written Opinion of the International Searching Authority dated Jul. 3, 2018 issued in International Application No. PCT/JP2018/020905.

Extended European Search Report (EESR) dated Feb. 10, 2021 issued in European Application No. 18808875.1.

Chinese Office Action (and partial English language translation thereof) dated Jan. 20, 2021 issued in Chinese Application No. 201780038857.4.

(Continued)

*Primary Examiner* — Matthew R Diaz

(74) *Attorney, Agent, or Firm* — Holtz, Holtz & Volek PC

(57) ABSTRACT

The present invention relates to a thermally conductive polysiloxane composition comprising: (A) a thermally conductive filler, (B) a siloxane compound having a specified structure; (C) an alkoxysilane compound having a specified structure; (D) a polyorganosiloxane containing at least one aliphatic unsaturated group per molecule; (E) a polyorganohydrogensiloxane having two or more hydrogen atoms bonded to silicon atoms per molecule; and (F) a platinum-based catalyst.

17 Claims, No Drawings

(56) References Cited

FOREIGN PATENT DOCUMENTS

| | | |
|---|---|---|
| JP | S62225533 A | 10/1987 |
| JP | 02097559 A | 4/1990 |
| JP | H06209057 A | 7/1994 |
| JP | 08208993 A | 8/1996 |
| JP | H11199672 A | 7/1999 |
| JP | 2000001616 A | 1/2000 |
| JP | 2000095896 A | 4/2000 |
| JP | 2000256558 A | 9/2000 |
| JP | 2001158609 A | 6/2001 |
| JP | 2001158610 A | 6/2001 |
| JP | 2001189407 A | 7/2001 |
| JP | 2002003831 A | 1/2002 |
| JP | 2002047009 A | 2/2002 |
| JP | 2002299533 A | 10/2002 |
| JP | 2003213133 A | 7/2003 |
| JP | 2004010880 A | 1/2004 |
| JP | 2005023246 A | 1/2005 |
| JP | 2005162975 A | 6/2005 |
| JP | 2006143978 A | 6/2006 |
| JP | 2007119588 A | 5/2007 |
| JP | 2008150439 A | 7/2008 |
| JP | 2008156578 A | 7/2008 |
| JP | 2008266449 A | 11/2008 |
| JP | 2008280395 A | 11/2008 |
| JP | 2009096961 A | 5/2009 |
| JP | 2009203373 A | 9/2009 |
| JP | 2010006923 A | 1/2010 |
| JP | 2010150321 A | 7/2010 |
| JP | 2013147600 A | 8/2013 |
| JP | 2013234237 A | 11/2013 |
| JP | 2014234506 A | 12/2014 |
| JP | 2015013927 A | 1/2015 |
| JP | 2015071662 A | 4/2015 |
| WO | 2005030874 A1 | 4/2005 |
| WO | 2008047809 A1 | 4/2008 |
| WO | 2009136508 A1 | 11/2009 |
| WO | 2015004115 A1 | 1/2015 |
| WO | 2016190188 A1 | 12/2016 |
| WO | 2016190189 A1 | 12/2016 |
| WO | 2017115679 A1 | 7/2017 |

OTHER PUBLICATIONS

Extended European Search Report (EESR) dated Mar. 6, 2020 issued in European Application No. 17831081.9.
International Search Report (ISR) dated Jan. 31, 2017 issued in International Application No. PCT/JP2016/082627.
International Search Report (ISR) dated Oct. 10, 2017 issued in International Application No. PCT/JP2017/026219.
International Search Report (ISR) dated Sep. 12, 2017 issued in International Application No. PCT/JP2017/026218.
Japanese Office Action (and English language translation thereof) dated Feb. 24, 2021 issued in Japanese Application No. 2018-100426.
Office Action (Final Rejection) dated Dec. 20, 2019 issued in related U.S. Appl. No. 15/772,690.
Office Action (Final Rejection) dated Jul. 15, 2020 issued in related U.S. Appl. No. 15/772,690.
Office Action (Non-Final Rejection) dated Mar. 1, 2021 issued in related U.S. Appl. No. 16/319,624.
Office Action (Non-Final Rejection) dated May 1, 2020 issued in related U.S. Appl. No. 15/772,690.
Office Action (Non-Final Rejection) dated Sep. 12, 2019 issued in related U.S. Appl. No. 15/772,690.
Related U.S. Appl. No. 15/772,690; First Named Inventor: Eiji Tanigawa; Title: "Method for Producing a Thermally Conductive Polysiloxane Composition"; filed May 1, 2018.
Related U.S. Appl. No. 16/319,624; First Named Inventor: Eiji Tanigawa; Title: "Surface Treatment Agent for Thermally Conductive Polyorganosiloxane Composition"; filed Jan. 22, 2019.
Related U.S. Appl. No. 16/319,639, First Named Inventor: Daigo Hirakawa; Title: "Thermally Conductive Polysiloxane Composition"; filed Jan. 22, 2019.
Written Opinion dated Jan. 31, 2017 issued in International Application No. PCT/JP2016/082627.
Written Opinion dated Oct. 10, 2017 issued in International Application No. PCT/JP2017/026219.
Written Opinion dated Sep. 12, 2017 issued in International Application No. PCT/JP2017/026218.
Korean Office Action (and English language translation thereof) dated May 12, 2021 issued in Korean Application No. 10-2019-7005321.
Office Action (Non-Final Rejection) dated Jun. 1, 2021 issued in related U.S. Appl. No. 15/772,690.
Chinese Office Action (and English language translation thereof) dated Jun. 8, 2021, issued in Chinese Application No. 201880036368.X.
Edited by Wang, "Green Chemical Additives", Jan. 2006.
Edited by Wang, "Production and Application of Epoxy Resins", Jun. 2001.
Zhou, et al., "Thermally Conductive Polymer Materials", Apr. 2014.

* cited by examiner

THERMALLY CONDUCTIVE POLYSILOXANE COMPOSITION

TECHNICAL FIELD

The present invention relates to a thermally conductive polysiloxane composition.

BACKGROUND ART

Electronic devices year after year have become higher in the integration and speed, and, according to such a tendency, demand for heat dissipation materials for dealing with heat generated from devices is increasing. In the heat dissipation materials, an addition-reaction curing type silicone resin composition is widely used, and is used in a way such that the composition is applied to a portion of an electronic device which needs heat dissipation and then is cured. A silicone resin cannot enhance the thermal conductivity by itself, and therefore a thermally conductive filler and the silicone resin are used in combination. It has been known that, as a thermally conductive filler, a material having a higher thermal conductivity than that of a silicone resin as a binder, such as a silica powder, alumina, boron nitride, aluminum nitride or magnesium oxide, is added (Patent Literature 1).

For increasing the thermal conductivity of the silicone resin composition, it is necessary to fill the composition with a thermally conductive filler at a higher filling ratio. However, the thermally conductive filler has a limitation of the filling property due to, for example, deterioration of the fluidity. Then, it has been known that the filling property is improved by subjecting the thermally conductive filler to a surface treatment (Patent Literature 2). On the other hand, it has been known that, by adding fumed silica to a silicone resin composition, thixotropic properties can be imparted to the composition to control the fluidity (Patent Literature 3).

CITATION LIST

Patent Literature

Patent Literature 1: JP 2002-003831 A
Patent Literature 2: WO 2005/030874 A1
Patent Literature 3: JP 2008-156578 A

SUMMARY OF INVENTION

Technical Problem

The use of electronic devices is expanding in a wide variety of fields, and there is demand for heat dissipation materials which can be applied to, for example, electronic parts in the state of vertically standing and devices having a three-dimensionally complicated shape. However, with respect to the addition-reaction curing type silicone resin compositions of Patent Literatures 1 and 2, when the composition was filled with a thermally conductive filler at a high filling ratio, while maintaining excellent application properties, so as to be usable in the above-mentioned applications, a slump of the composition after being applied occurred, and thus the workability of the composition was poor. When the composition was produced so that a slump did not occur, the resultant composition had an increased viscosity, and thus was poor in application properties.

Further, with respect to the silicone resin compositions of Patent Literatures 1 and 2, when an attempt was made to solve the problems about the application properties and the slump by adding fumed silica to the composition, the amount of the fumed silica added was such small that it was difficult to achieve excellent balance between the low viscosity and the thixotropic properties of the composition, and this method could not satisfactorily achieve both excellent application properties and prevention of the slump.

Meanwhile, in order to prevent deterioration of the heat dissipation properties of the heat dissipation material due to a change of the adhesion of the material to an electronic device with the passage of time, the material is required to have a small change of the hardness with time.

Accordingly, the problem to be solved by the present invention is to provide a thermally conductive polysiloxane composition which is advantageous not only in that the composition has a low viscosity and hence exhibits excellent application properties, and further a slump of the composition after being applied does not occur, but also in that a cured product of the composition has a small change of the hardness with time.

Solution to Problem

The present inventors have paid attention to a surface treatment agent and an additive for a thermally conductive filler, and have conducted various studies on the surface treatment agent and the additive. As a result, the present invention has been completed.

The gist of the present invention is as follows.

(1) A thermally conductive polysiloxane composition comprising:

(A) a thermally conductive filler;

(B) a siloxane compound represented by the following general formula (1):

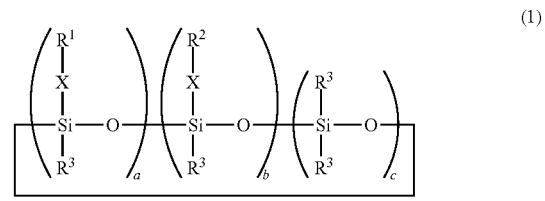

wherein:
$R^1$ is a group having an alkoxysilyl group with 1 to 4 carbon atoms;
$R^2$ is a group having a siloxane unit represented by the following general formula (2):

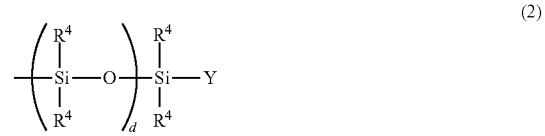

wherein each $R^4$ is independently a monovalent hydrocarbon group having 1 to 12 carbon atoms, Y is a group selected from the group consisting of $R^1$, $R^4$, and an aliphatic unsaturated group, and d is an integer of 2 to 500 or a monovalent hydrocarbon group having 6 to 18 carbon atoms;

each X is independently a divalent hydrocarbon group having 2 to 10 carbon atoms;
each of a and b is independently an integer of 1 or more;
c is an integer of 0 or more;
a+b+c is an integer of 4 or more; and
each $R^3$ is independently a monovalent hydrocarbon group having 1 to 6 carbon atoms, or a hydrogen atom;
(C) an alkoxysilane compound represented by the following general formula (3):

$$R^{11}{}_eR^{12}{}_f\text{Si}(OR^{13})_{4-(e+f)} \tag{3}$$

wherein each $R^{11}$ is independently an alkyl group having 6 to 18 carbon atoms, each $R^{12}$ is independently an unsubstituted or substituted acyclic monovalent hydrocarbon group having 1 to 5 carbon atoms, an unsubstituted or substituted cycloalkyl group, an unsubstituted or substituted aryl group, or an unsubstituted or substituted aralkyl group, each $R^{13}$ is independently an alkyl group having 1 to 6 carbon atoms, e is an integer of 1 to 3, and f is an integer of 0 to 2, with the proviso that e+f is an integer of 1 to 3;
(D) a polyorganosiloxane containing at least one aliphatic unsaturated group per molecule;
(E) a polyorganohydrogensiloxane having two or more hydrogen atoms bonded to silicon atoms per molecule; and
(F) a platinum-based catalyst.

(2) The thermally conductive polysiloxane composition according to item (1) above, wherein the blending ratio of the component (B) and the component (C), in terms of a mass ratio, is in the range of from 95:5 to 55:45.

(3) The thermally conductive polysiloxane composition according to item (1) or (2) above, wherein the component (A) comprises 20 to 70% by mass of (A-1) inorganic particles having an average particle diameter of 30 to 150 μm, 1 to 50% by mass of (A-2) inorganic particles having an average particle diameter of 1 to less than 30 μm, and 1 to 50% by mass of (A-3) inorganic particles having an average particle diameter of 0.1 to less than 1 μm.

(4) The thermally conductive polysiloxane composition according to any one of items (1) to (3) above, which further comprises (G) fumed silica chemically treated with a silazane compound, wherein the blending amount of the component (G) is 0.1 to 10 parts by mass, relative to 100 parts by mass of the component (D).

(5) A silicone rubber which is obtained by curing the thermally conductive polysiloxane composition according to any one of items (1) to (4) above.

(6) An electronic part comprising the silicone rubber according to item (5) above.

Advantageous Effects of Invention

In the present invention, there can be provided a thermally conductive polysiloxane composition which is advantageous not only in that the composition has a low viscosity and hence exhibits excellent application properties, and further a slump of the composition after being applied does not occur, but also in that a cured product of the composition has a small change of the hardness with time.

DESCRIPTION OF EMBODIMENTS

The present invention is a thermally conductive polysiloxane composition which comprises:
(A) a thermally conductive filler;
(B) a siloxane compound represented by the following general formula (1):

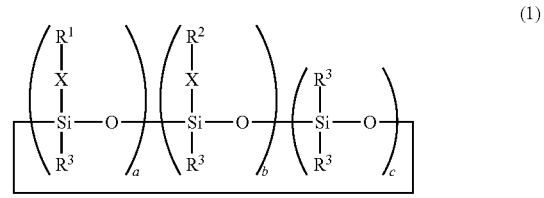

wherein:
$R^1$ is a group having an alkoxysilyl group with 1 to 4 carbon atoms;
$R^2$ is a group having a siloxane unit represented by the following general formula (2):

wherein each $R^4$ is independently a monovalent hydrocarbon group having 1 to 12 carbon atoms, Y is a group selected from the group consisting of $R^1$, $R^4$, and an aliphatic unsaturated group, and d is an integer of 2 to 500
or a monovalent hydrocarbon group having 6 to 18 carbon atoms;
each X is independently a divalent hydrocarbon group having 2 to 10 carbon atoms;
each of a and b is independently an integer of 1 or more;
c is an integer of 0 or more;
a+b+c is an integer of 4 or more; and
each $R^3$ is independently a monovalent hydrocarbon group having 1 to 6 carbon atoms, or a hydrogen atom;
(C) an alkoxysilane compound represented by the following general formula (3):

$$R^{11}{}_eR^{12}{}_f\text{Si}(OR^{13})_{4-(e+f)} \tag{3}$$

wherein each $R^{11}$ is independently an alkyl group having 6 to 18 carbon atoms, each $R^{12}$ is independently an unsubstituted or substituted acyclic monovalent hydrocarbon group having 1 to 5 carbon atoms, an unsubstituted or substituted cycloalkyl group, an unsubstituted or substituted aryl group, or an unsubstituted or substituted aralkyl group, each $R^{13}$ is independently an alkyl group having 1 to 6 carbon atoms, e is an integer of 1 to 3, and f is an integer of 0 to 2, with the proviso that e+f is an integer of 1 to 3;
(D) a polyorganosiloxane containing at least one aliphatic unsaturated group per molecule;
(E) a polyorganohydrogensiloxane having two or more hydrogen atoms bonded to silicon atoms per molecule; and
(F) a platinum-based catalyst.

[Component (A)]

Examples of thermally conductive fillers as component (A) include generally known inorganic particles, such as alumina, magnesium oxide, zinc oxide, silica (a quartz powder), boron nitride, aluminum nitride, silicon carbide, a metal powder, diamond, aluminum hydroxide, and carbon. Especially preferred are alumina, zinc oxide, aluminum nitride, and silicon carbide. With respect to the inorganic particles, there is no particular limitation as long as they are of grades that can be used as component (A), and those which are commercially available can be used. Further, a plurality of types of inorganic particles of different chemical species can be used in combination. Component (A) does not include (G) fumed silica chemically treated with a silazane compound.

With respect to the average particle diameter of component (A), there is no particular limitation, but from the viewpoint of the filling ratio and the viscosity of the thermally conductive polysiloxane composition, component (A) having an average particle diameter of 300 μm or less is preferably used. With respect to component (A), it is preferred that a filler having a relatively large particle diameter and a filler having a relatively small particle diameter are used in combination. By using a plurality of types of fillers having different particle diameters in combination, the filler having a relatively small particle diameter goes into voids formed in the filler having a relatively large particle diameter, enabling higher filling. Especially, it is preferred that component (A) comprises 20 to 70% by mass of (A-1) inorganic particles having an average particle diameter of 30 to 150 μm, 1 to 50% by mass of (A-2) inorganic particles having an average particle diameter of 1 to less than 30 μm, and 1 to 50% by mass of (A-3) inorganic particles having an average particle diameter of 0.1 to less than 1 μm, because a thermally conductive polysiloxane composition having excellent operation properties and a low viscosity as well as high thermal conductivity can be obtained. The present inventors have found that, with respect to the composition prepared further using component (A-2) in addition to component (A-1) and component (A-3), difference in particle diameter between the components is not too large, and the efficiency of mixing component (A) into components (B) and (C) is further improved so that a uniform composition can be easily obtained, and the viscosity of the composition is further reduced, as compared to those of the composition of a two-component system prepared using component (A-1) and component (A-3).

Component (A-1) has a particle size distribution peak in the range of from 30 to 150 μm. In the case where the average particle diameter of component (A-1) is 30 to 150 μm, even when the polysiloxane composition is filled with component (A) at a high filling ratio, the thermally conductive polysiloxane composition can be easily reduced in viscosity and increased in thermal conductivity. The average particle diameter of component (A-1) is more preferably 50 to 120 μm, especially preferably 60 to 100 μm.

Component (A-2) has a particle size distribution peak in the range of from 1 to less than 30 μm. When the average particle diameter of component (A-2) is 1 to less than 30 μm, it is more likely that the efficiency of mixing components (A-1) to (A-3) into components (B) and (C) is further improved so that a uniform composition can be easily obtained, and that the viscosity of the composition is further reduced. The average particle diameter of component (A-2) is more preferably 1 to 20 μm, further preferably 2 to 15 μm, especially preferably 3 to less than 10 μm. The average particle diameter of component (A-2) can be 1 to 10 μm.

Component (A-3) has a particle size distribution peak in the range of from 0.1 to less than 1 μm. The average particle diameter of component (A-3) is preferably 0.1 to less than 1 μm because component (A-3) acts so as to prevent, for example, settling of component (A-1). The average particle diameter of component (A-3) is more preferably 0.15 to 0.9 μm, especially preferably 0.2 to 0.8 μm.

With respect to the blending ratio of components (A-1) to (A-3), from the viewpoint of obtaining the thermally conductive polysiloxane composition having uniformity, a low viscosity and high thermal conductivity, it is preferred that component (A) comprises 20 to 70% by mass of component (A-1), 1 to 50% by mass of component (A-2), and 1 to 50% by mass of component (A-3), it is more preferred that component (A) comprises 25 to 65% by mass of component (A-1), 5 to 45% by mass of component (A-2), and 5 to 45% by mass of component (A-3), and it is especially preferred that component (A) comprises 30 to 60% by mass of component (A-1), 10 to 40% by mass of component (A-2), and 10 to 40% by mass of component (A-3).

Examples of components (A-1) to (A-3) include the above-mentioned generally known inorganic particles. Of these, alumina is preferred.

As examples of shapes of the inorganic particles used in component (A), there can be mentioned a spherical shape, a rounded shape, an indefinite shape, and a polyhedral shape, but the shape of the inorganic particles is not limited to those mentioned above.

In the present invention, the average particle diameter of each of components (A-1) to (A-3) is a median diameter (d50), as measured by a laser diffraction scattering method.

With respect to each of components (A-1) to (A-3), a single type of inorganic particles may be used, or two or more types of inorganic particles may be used in combination.

In the thermally conductive polysiloxane resin composition, organic or inorganic particles other than components (A-1) to (A-3) can be blended in such an amount that the effects of the present invention are not sacrificed.

[Component (B)]

Component (B) is a siloxane compound represented by the following general formula (1):

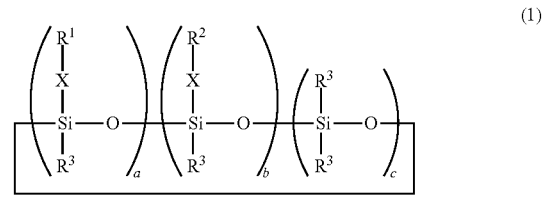

wherein:
R$^1$ is a group having an alkoxysilyl group with 1 to 4 carbon atoms;
R$^2$ is a group having a siloxane unit represented by the following general formula (2):

wherein each R$^4$ is independently a monovalent hydrocarbon group having 1 to 12 carbon atoms, Y is a group selected from the group consisting of R$^1$, R$^4$, and an aliphatic unsaturated group, and d is an integer of 2 to 500
or a monovalent hydrocarbon group having 6 to 18 carbon atoms;
each X is independently a divalent hydrocarbon group having 2 to 10 carbon atoms;
each of a and b is independently an integer of 1 or more;

c is an integer of 0 or more;

a+b+c is an integer of 4 or more; and each $R^3$ is independently a monovalent hydrocarbon group having 1 to 6 carbon atoms, or a hydrogen atom.

In the siloxane compound, the unit containing $R^1$, the unit containing $R^2$, and the unit represented by $SiR^3{}_2O$ are not necessarily arranged as shown in the general formula (1) above, and it is understood that, for example, the unit represented by $SiR^3{}_2O$ may be present between the unit containing $R^1$ and the unit containing $R^2$.

The siloxane compound having the cyclic structure represented by the general formula (1) can introduce a large number of hydrolyzable groups into the cyclic structure, and further the hydrolyzable groups are positionally concentrated, and therefore the siloxane compound is considered to have an increased treatment efficiency for component (A), enabling higher filling. In addition, the siloxane compound per se has high heat resistance, and therefore can impart high heat resistance to the thermally conductive polysiloxane composition. As a result, a cured product of the thermally conductive polysiloxane composition has a small change of the hardness when experiencing heat with the passage of time, making it possible to maintain the stable heat dissipation properties.

Such a siloxane compound has an advantage in that the compound can be easily obtained by, for example, subjecting to addition reaction a cyclic siloxane containing a hydrogen group, a siloxane having a vinyl group at one end thereof, and a silane compound containing a vinyl group and a hydrolyzable group.

In the general formula (1), $R^1$ is a hydrolyzable functional group having an alkoxysilyl group with 1 to 4 carbon atoms. $R^1$ may be directly bonded to X with silicon, but may be bonded to X through a linking group, such as an ester linkage. More specific examples of $R^1$'s include groups having the structures shown below.

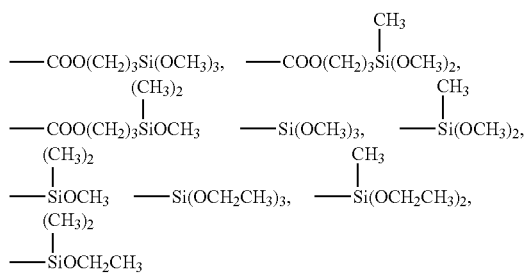

Especially, in view of a tendency toward a further improvement of the treatment efficiency for the thermally conductive filler, $R^1$ is preferably a group of a structure having two or more alkoxy groups, especially having three alkoxy groups. Further, in view of easy availability of the raw material, $R^1$ preferably contains a methoxysilyl group.

$R^2$ is selected from a group having a siloxane unit and a long-chain alkyl group. When $R^2$ is a long-chain alkyl group, the long-chain alkyl group has 6 to 18 carbon atoms, preferably 6 to 14 carbon atoms. The term "long-chain alkyl group" means an alkyl group in which the longest carbon chain portion has 6 or more carbon atoms, and which may have a branched structure as long as the total number of carbon atoms is within the above range. When the number of carbon atoms of the alkyl group is in the above range, the effect on the fluidity is improved, enabling high incorporation of component (A). Further, excellent handling properties are achieved, facilitating uniform dispersion.

When $R^2$ is a group having a siloxane unit, $R^2$ is a group represented by the following general formula (2):

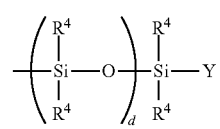

wherein $R^4$, Y, and d are as defined above.

In the general formula (2), d is a number in the range of from 2 to 500, preferably in the range of from 4 to 400, more preferably in the range of from 10 to 200, especially preferably in the range of from 10 to 60. When d is in the above range, the effect on the fluidity is improved, enabling high incorporation of component (A), and the viscosity of the siloxane compound per se can be reduced. Each $R^4$ is independently a monovalent hydrocarbon group having 1 to 12 carbon atoms, and examples of $R^4$'s include linear or branched $C_{1-12}$ alkyl groups, and aryl groups, such as phenyl and naphthyl. $R^4$ may be substituted with a halogen, such as chlorine, fluorine or bromine, and examples of such groups include perfluoroalkyl groups, such as a trifluoromethyl group. In view of easy synthesis of the compound, $R^4$ is preferably a methyl group. Y is a group selected from the group consisting of $R^1$, $R^4$, and an aliphatic unsaturated group. The aliphatic unsaturated group preferably has 2 to 10 carbon atoms, more preferably has 2 to 6 carbon atoms. In view of easy occurrence of curing reaction, the aliphatic unsaturated group preferably has a double bond at an end. In view of easy synthesis of the compound, Y is preferably a methyl group or a vinyl group. $R^2$ is preferably the group having a siloxane unit because it is more likely that the resultant siloxane compound enhances the affinity with the thermally conductive filler through components (D) and (E) as a base polymer, so that a composition having excellent handling properties, for example, having a reduced viscosity can be obtained.

$R^1$ and $R^2$ are individually bonded through group X to the cyclic siloxane portion of the siloxane compound represented by the general formula (1). Each group X is independently a divalent hydrocarbon group having 2 to 10 carbon atoms, and examples of such groups include alkylene groups, such as —$CH_2CH_2$—, —$CH_2CH_2CH_2$—, —$CH_2CH_2CH_2CH_2CH_2CH_2$—, —$CH_2CH(CH_3)$—, and —$CH_2CH(CH_3)CH_2$—. In view of easy synthesis of the compound, X is preferably —$CH_2CH_2$— or —$CH_2CH(CH_3)$—.

Each $R^3$ is independently a monovalent hydrocarbon group having 1 to 6 carbon atoms, or a hydrogen atom. $R^3$'s may be the same or different. In view of easy synthesis of the compound, $R^3$ is preferably a methyl group or a hydrogen atom.

a is an integer of 1 or more, preferably 1. b is an integer of 1 or more, preferably 1 or 2. c is an integer of 0 or more, preferably 0 to 2. Further, the total of a+b+c is an integer of 4 or more, and is preferably 4 in view of easy synthesis of the compound. When b is 2, $R^2$ is preferably selected so that the total of units represented by —$SiR^4{}_2O$— becomes 10 to 60 from the viewpoint of the handling properties.

With respect to component (B), compounds represented by the structural formulae shown below can be preferably used, but component (B) is not limited to these compounds.

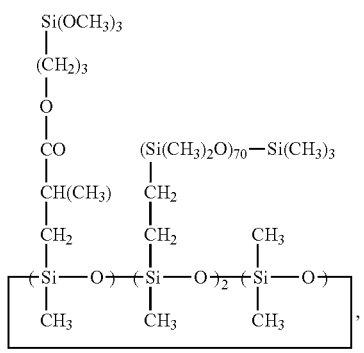
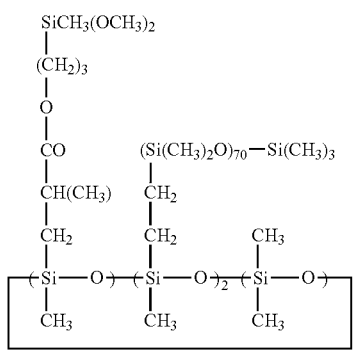
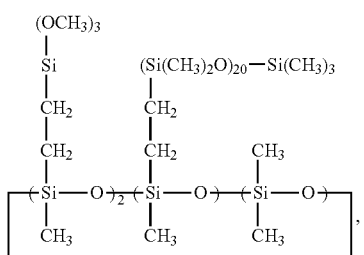
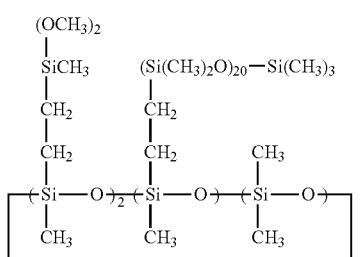
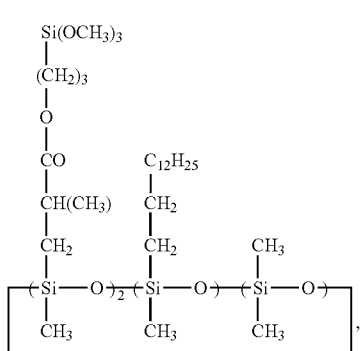
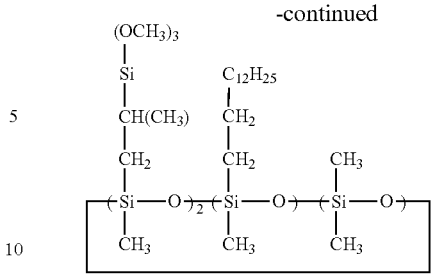
As further preferred examples of component (B), there can be mentioned compounds represented by the structural formulae shown below.
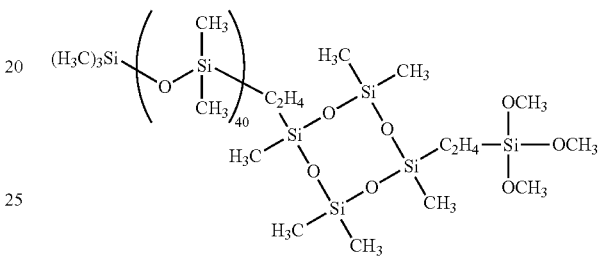
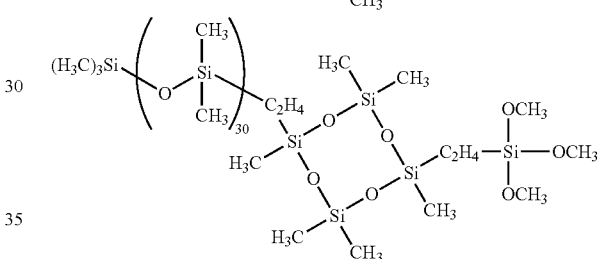
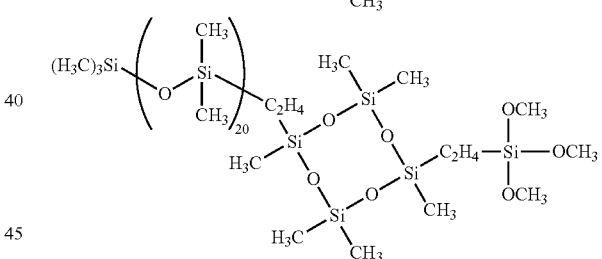
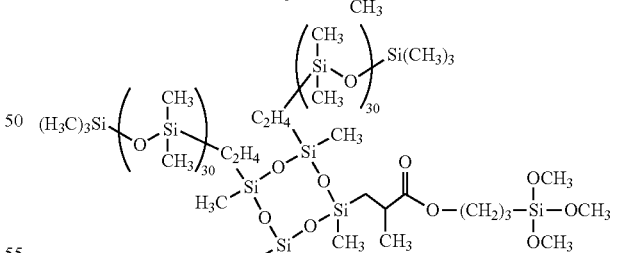
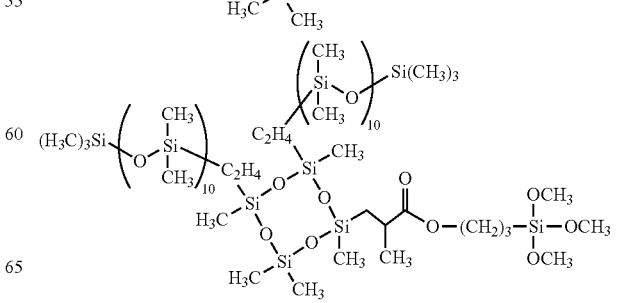

-continued

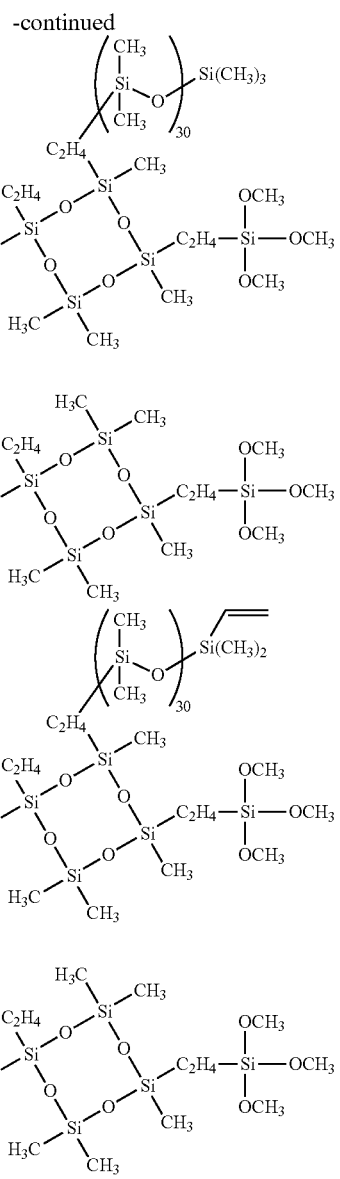

In the description of the structure of the siloxane compound, the structural units of the siloxane compound are frequently indicated using the abbreviations shown below (hereinafter, these structural units are frequently respectively referred to as, for example, "M unit" and "D unit").

M: —Si(CH$_3$)$_3$O$_{1/2}$
M$^H$: —SiH(CH$_3$)$_2$O$_{1/2}$
M$^{Vi}$: —Si(CH=CH$_2$)(CH$_3$)$_2$O$_{1/2}$
D: Si(CH$_3$)$_2$O$_{2/2}$
D$^H$: SiH(CH$_3$)O$_{2/2}$
T: Si(CH$_3$)O$_{3/2}$
Q: SiO$_{4/2}$

For example, the structure of the general formula (2) above wherein R$^4$ is a methyl group and Y is a vinyl group is indicated as -D$_j$M$^{Vi}$. In this connection, for example, when a structure is indicated as D$^H{}_{20}$D$_{20}$, it is understood that the indication is not intended to show that 20 D$^H$ units are continuously disposed and then 20 D units are continuously disposed, but shows that the individual units may be arbitrarily arranged.

The blending amount of component (B) is preferably in the range of from 0.01 to 20 parts by mass, relative to 100 parts by mass of component (A). When the blending amount of component (B) is in the above range, the filling property of component (A) can be easily improved while maintaining the low viscosity of the thermally conductive polysiloxane composition, and a cured product of the composition is more likely to have a reduced change of the hardness with time. The blending amount of component (B) is more preferably in the range of from 0.1 to 15 parts by mass, especially preferably 0.2 to 10 parts by mass.

With respect to component (B), a single type of siloxane compound may be used, or two or more types of siloxane compounds may be used in combination.

[Component (C)]

Component (C) is an alkoxysilane compound represented by the following general formula (3):

wherein each R$^{11}$ is independently an alkyl group having 6 to 18 carbon atoms, each R$^{12}$ is independently an unsubstituted or substituted acyclic monovalent hydrocarbon group having 1 to 5 carbon atoms, an unsubstituted or substituted cycloalkyl group, an unsubstituted or substituted aryl group, or an unsubstituted or substituted aralkyl group, each R$^{13}$ is independently an alkyl group having 1 to 6 carbon atoms, e is an integer of 1 to 3, and f is an integer of 0 to 2, with the proviso that e+f is an integer of 1 to 3.

By blending component (C), component (C) can impart thixotropic properties in association with component (B) to the thermally conductive polysiloxane composition without markedly increasing the viscosity of the composition. Component (C) is a component which has an alkoxy group and a low viscosity, and which is appropriately poor in the compatibility with component (D). From this, it is considered that component (C) can impart thixotropic properties to the composition without markedly increasing the viscosity of the composition.

In the general formula (3), examples of R$^{11}$'s include linear or branched alkyl groups. R$^{11}$ is preferably a linear alkyl group, and examples of such alkyl groups include a hexyl group, an octyl group, a nonyl group, a decyl group, a dodecyl group, a tetradecyl group, a hexadecyl group, and an octadecyl group. When R$^{11}$ has 6 to 18 carbon atoms, component (C) is in a liquid state at room temperature and is easy to handle, and has excellent wettability with component (A), and interacts with component (D), making it possible to impart thixotropic properties to the composition. R$^{11}$ more preferably has 6 to 14 carbon atoms, especially preferably has 6 to 10 carbon atoms.

Examples of R$^{12}$'s include alkyl groups, such as a methyl group, an ethyl group, a propyl group, an isopropyl group, a butyl group, an isobutyl group, and a tert-butyl group; aliphatic unsaturated groups, such as a vinyl group and an allyl group; cycloalkyl groups, such as a cyclopentyl group, a cyclohexyl group, and a cyclobutyl group; aryl groups, such as a phenyl group, a tolyl group, a xylyl group, and a naphthyl group; aralkyl groups, such as a benzyl group, a 2-phenylethyl group, a 2-methyl-2-pbenylethyl group, and a phenylpropyl group; and groups obtained by substituting part of or all of hydrogen atoms of the above hydrocarbon group with a halogen atom, such as chlorine, fluorine or bromine, a cyano group or the like, for example, halogenated hydrocarbon groups, such as a chloromethyl group, a trifluoropropyl group, a 3,3,3-trifluoropropyl group, a 2-(nonafluorobutyl)ethyl group, a 2-(heptadecafluorooctyl)ethyl group, a chlorophenyl group, a bromophenyl group, a dibromophenyl group, a tetrachlorophenyl group, a fluorophenyl group, and a difluorophenyl group, and cyanoalkyl groups, such as an α-cyanoethyl group, a β-cyanopropyl group, and a γ-cyanopropyl group, and preferred are a methyl group and an ethyl group.

Examples of $R^{13}$'s include a methyl group, an ethyl group, a propyl group, a butyl group, a pentyl group, and a hexyl group, and preferred are a methyl group and an ethyl group.

e is preferably 1, and f is preferably 0 or 1.

As examples of alkoxysilane compounds of the general formula (3) wherein e=1, there can be mentioned the following compounds.

$C_6H_{13}Si(OCH)$
$C_{10}H_{21}Si(OCH_3)_3$
$C_{10}H_{21}Si(OC_2H_5)_3$
$C_{12}H_{25}Si(OCH_3)_3$
$C_{12}H_{25}Si(OC_2H_5)_3$
$C_{10}H_{21}Si(CH_3)(OCH_3)_2$
$C_{10}H_{21}Si(C_6H_5)(OCH_3)_2$
$C_{10}H_{21}Si(CH_3)(OC_2H_5)_2$
$C_{10}H_{21}Si(CH=CH_2)(OCH_3)_2$
$C_{10}H_{21}Si(CH_2CH_2CF_3)(OCH_3)_2$

The blending amount of component (C) is preferably in the range of from 0.01 to 12 parts by mass, relative to 100 parts by mass of component (A). When the blending amount of component (C) is in the above range, thixotropic properties can be imparted to the thermally conductive polysiloxane composition while maintaining the low viscosity of the composition. The blending amount of component (C) is more preferably in the range of from 0.05 to 10 parts by mass, especially preferably 0.1 to 5 parts by mass.

The blending ratio of component (B) and component (C), in terms of a mass ratio, is preferably in the range of from 95:5 to 55:45. When the ratio is in the above-mentioned range, thixotropic properties can be easily imparted to the thermally conductive polysiloxane composition while maintaining the low viscosity of the composition, and a cured product of the composition is more likely to have a reduced change of the hardness with time. The blending ratio is more preferably 90:10 to 60:40, further preferably 85:15 to 65:35, especially preferably 85:15 to 75:25.

With respect to component (C), a single type of alkoxysilane compound may be used, or two or more types of alkoxysilane compounds may be used in combination.

[Component (D)]

Component (D) is a polyorganosiloxane containing at least one aliphatic unsaturated group per molecule, and there can be used a polyorganosiloxane represented by the following average compositional formula (II):

$$R^{21}{}_g R^{22}{}_h SiO_{[4-(g+h)]/2} \quad (II)$$

wherein $R^{21}$ is an aliphatic unsaturated group, $R^{22}$ is a substituted or unsubstituted monovalent hydrocarbon group containing no aliphatic unsaturated bond, and g and h are positive numbers which satisfy the relationships: $0<g<3$, $0<h<3$, and $1<g+h<3$.

The aliphatic unsaturated group in $R^{2'}$ preferably has 2 to 8 carbon atoms, and examples of such groups include a vinyl group, an allyl group, a propenyl group, a 1-butenyl group, and a 1-hexenyl group, and preferred is a vinyl group. One or more, preferably two or more aliphatic unsaturated groups are contained per molecule. Further, the aliphatic unsaturated groups may be bonded to a silicon atom at an end of the molecular chain, bonded to a silicon atom in the middle of the molecular chain, or bonded to both of them.

As specific examples of $R^{22}$'s, there can be mentioned groups which are mentioned above as examples of $R^{12}$ in the general formula (3), excluding aliphatic unsaturated groups, such as a vinyl group and an allyl group. Of these, preferred are alkyl groups and aryl groups, and more preferred are a methyl group and a phenyl group.

g and h are preferably numbers which satisfy the relationships: $0.0005 \leq g \leq 1$, $1.5 \leq h < 2.4$, and $1.5 < g+h < 2.5$, more preferably numbers which satisfy the relationships: $0.001 \leq g \leq 0.5$, $1.8 \leq h \leq 2.1$, and $1.8 < g+h \leq 2.2$.

The molecular structure of component (D) can be linear, branched, or cyclic, but a linear or branched molecular structure is preferred.

Component (D) preferably has a viscosity at 23° C. of 10 to 10,000 mPa·s, more preferably 20 to 5,000 mPa·s.

With respect to the blending amount of component (D), component (D) is contained so that the total amount of components (B) to (D) is preferably 1.5 to 35 parts by mass, more preferably 1.5 to 30 parts by mass, especially preferably 1.5 to 28 parts by mass, relative to 100 parts by mass of component (A). The content of component (D) in the total of components (B) to (D) is preferably 15 to 98% by mass, more preferably 18 to 98% by mass, especially preferably 20 to 98% by mass.

With respect to component (D), a single type of polyorganosiloxane may be used, or two or more types of polyorganosiloxanes may be used in combination.

[Component (E)]

Component (E) is a polyorganohydrogensiloxane having two or more hydrogen atoms bonded to silicon atoms per molecule, and is a component that serves as a crosslinking agent for component (D) and for component (B) and/or component (C) in the case where component (B) and/or component (C) has at least one aliphatic unsaturated group (for example, Y in $R^2$ of the general formula (1) and/or $R^{12}$ of the general formula (3) is an aliphatic unsaturated group). Component (E) has two or more, preferably three or more hydrogen atoms bonded to silicon atoms per molecule. These hydrogen atoms may be bonded to a silicon atom at an end of the molecular chain, bonded to a silicon atom in the middle of the molecular chain, or bonded to both of them. Alternatively, a polyorganohydrogensiloxane having hydrogen atoms bonded only to silicon atoms at both ends can be used. The molecular structure of component (E) may be any of linear, branched, cyclic, and three-dimensional network structures, and a single type of polyorganohydrogensiloxane may be used, or two or more types of polyorganohydrogensiloxanes may be used in combination.

With respect to component (E), there can be used a polyorganohydrogensiloxane represented by the following average compositional formula (III):

$$R^{31}{}_m H_n SiO_{[4-(m+n)]/2} \quad (III)$$

wherein $R^{31}$ is a substituted or unsubstituted monovalent hydrocarbon group containing no aliphatic unsaturated bond, and m and n are numbers which satisfy the relationships: $0.5 \leq m \leq 2$, $0 < n \leq 2$, and $0.5 < m+n \leq 3$.

As specific examples of $R^{31}$'s, there can be mentioned groups which are mentioned above as examples of $R^{12}$ in the general formula (3), excluding aliphatic unsaturated groups, such as a vinyl group and an allyl group. Of these, in view of easy synthesis of the compound and the cost, preferred are alkyl groups, and more preferred is a methyl group.

m and n are preferably numbers which satisfy the relationships: $0.6 \leq m \leq 1.9$, $0.01 \leq n \leq 1.0$, and $0.6 \leq m+n \leq 2.8$.

Component (E) preferably has a viscosity of 10 to 500 mPa·s at 23° C.

Component (E) is blended in an amount such that the number of hydrogen atoms bonded to silicon atoms in component (E) becomes 0.1 to 1.5, preferably 0.2 to 1.2, relative to one aliphatic unsaturated group bonded to a silicon atom in component (D), and component (B) and/or component (C) in the case where component (B) and/or component (C) has at least one aliphatic unsaturated group. When the blending amount of component (E) is in the above-mentioned range, it is more likely that the thermally conductive polysiloxane composition has excellent stability with time, and the degree of crosslinking in a cured product of the composition is satisfactory, so that the cured product having an appropriate hardness can be obtained.

[Component (F)]

Component (F) is a platinum-based catalyst, which is a component that accelerates curing after mixing component (D), and component (B) and/or component (C) in the case where component (B) and/or component (C) has at least one aliphatic unsaturated group, with component (E). With respect to component (F), a well-known catalyst for use in a hydrosilylation reaction can be used. Examples of such catalysts include platinum black, platinic chloride, chloroplatinic acid, a reaction product of chloroplatinic acid and a monohydric alcohol, a complex of chloroplatinic acid and an olefin or a vinylsiloxane, a platinum-vinyltetramer complex, and platinum bisacetoacetate. The blending amount of component (F) can be appropriately selected according to, for example, a desired curing rate, and is preferably in the range of from 0.1 to 1,000 ppm, in terms of a platinum element, based on the total amount of component (D), and component (B) and/or component (C) in the case where component (B) and/or component (C) has at least one aliphatic unsaturated group, as well as component (E). With respect to component (F), a single type of platinum-based catalyst may be used, or two or more types of platinum-based catalysts may be used in combination.

Further, for obtaining a longer pot life, the activity of the catalyst can be suppressed by adding (F-2) a reaction inhibitor. Examples of known reaction inhibitors for metals of the platinum group include acetylenic alcohols, such as 2-methyl-3-butyn-2-ol, 1-ethynyl-1-cyclohexanol, and 1-ethynyl-2-cyclohexanol.

[Component (G)]

It is preferred that the thermally conductive polysiloxane composition further comprises (G) fumed silica chemically treated with a silazane compound, wherein the blending amount of component (G) is 0.1 to 10 parts by mass, relative to 100 parts by mass of component (D), from the viewpoint of imparting thixotropic properties to the thermally conductive polysiloxane composition while maintaining the compatibility and low viscosity of the composition.

Fumed silica is generally produced by a flame hydrolysis method called a dry method in contrast to a wet method. Specifically, a method for producing fumed silica by burning silicon tetrachloride, together with hydrogen and oxygen, is generally known, but, in stead of silicon tetrachloride, a silane, such as methyltrichlorosilane or trichlorosilane, can be used solely or in the form of a mixture with silicon tetrachloride. Fumed silica is commercially available from Nippon Aerosil Co., Ltd. under the name of AEROSIL, or from Tokuyama Corporation under the name of QS Type.

Component (G) is preferably fumed silica having a BET specific surface area of 50 to 300 m$^2$/g because thixotropic properties can be readily imparted to the thermally conductive polysiloxane composition without markedly increasing the viscosity of the composition. The BET specific surface area of the fumed silica is more preferably 100 to 270 m$^2$/g, especially preferably 150 to 250 m$^2$/g.

Examples of silazane compounds include hexamethyldisilazane, 1,3-divinyl-1,1,3,3-tetramethyldisilazane, 1,3-bis(chloromethyl)tetramethyldisilazane, 1,3-bis(3,3,3-trifluoropropyl)-1,1,3,3-tetramethyldisilazane, 1,3-diphenyltetramethyldisilazane, heptamethyldisilazane, 2,2,4,4,6,6-hexamethylcyclotrisilazane, octamethylcyclotetrasilazane, 1,1,3,3-tetramethyldisilazane, and 2,4,6-trimethyl-2,4,6-trivinylcyclotrisilazane. Particularly, from the viewpoint of the degree of treatment for fumed silica and stability (inactivation) of the surface state of the treated fumed silica, hexamethyldisilazane is preferred.

The blending amount of component (G) is preferably 0.1 to 10 parts by mass, more preferably 0.3 to 5 parts by mass, especially preferably 0.5 to 3 parts by mass, relative to 100 parts by mass of component (D). When the blending amount of component (G) is 0.1 part by mass or more, an improvement of the thixotropic properties of the composition and an effect of the prevention of a slump are found, and, when the blending amount of component (G) is 10 parts by mass or less, it is possible to maintain the low viscosity of the composition.

[Other Components]

The thermally conductive polysiloxane composition can further contain, if necessary, a flame retardancy imparting agent, a heat resistance improving agent, a plasticizer, a colorant, a tackifier, a diluent or the like in such an amount that the purpose of the present invention are not sacrificed.

[Thermally Conductive Polysiloxane Composition]

The thermally conductive polysiloxane composition can be obtained by successively adding and mixing components (A) to (F) and optional component (G) and others, or adding them at the same time and mixing them together, by means of a mixer, such as a planetary mixer. With respect to the order of adding and mixing components (A) to (F) and optional component (G) and others, there is no particular limitation, but it is preferred that component (A) is preliminarily mixed into components (B) to (D), and then the remaining components are added to and mixed into the resultant mixture. In this case, any of or all of the remaining components can be simultaneously added to and mixed into the mixture of components (A) to (D). During the mixing, if necessary, the mixture being mixed may be heated at a temperature in the range of from 50 to 180° C. For achieving further uniform finishing, it is preferred that the mixture is subjected to kneading operation under a high shear force. Examples of kneading apparatuses include a three-roll mill, a colloid mill, and a sand grinder, and, of these, preferred is a method using a three-roll mill.

From the viewpoint of the application properties and prevention of a slump, the thermally conductive polysiloxane composition preferably has a viscosity of 50 to 1,000 Pa·s at 23° C. The viscosity in the present invention is a value as measured using a rotational viscometer rotor No. 7 at a rotational speed of 20 rpm for one minute in accordance with JIS K6249. The viscosity of the thermally conductive polysiloxane composition is more preferably 100 to 750 Pa·s, especially preferably 150 to 500 Pa·s.

From the viewpoint of prevention of a slump, the thermally conductive polysiloxane composition preferably has a thixotropy ratio of 1.40 to 2.00, wherein the thixotropy ratio is a value determined from the formula: $V_{10\ rpm}/V_{20\ rpm}$, wherein $V_{20\ rpm}$ is a viscosity of the thermally conductive polysiloxane composition at 23° C., as measured at a rotational speed of 20 rpm, and $V_{10\ rpm}$ is a viscosity of the thermally conductive polysiloxane composition at 23° C., as measured at a rotational speed of 10 rpm using the same rotor as used in the measurement at a rotational speed of 20 rpm. The thixotropy ratio is more preferably 1.45 to 1.80, especially preferably 1.47 to 1.60.

[Cured Product of the Thermally Conductive Polysiloxane Composition]

With respect to the thermally conductive polysiloxane composition, a silicone rubber can be obtained by subjecting component (D), and component (B) and/or component (C) in the case where component (B) and/or component (C) has at least one aliphatic unsaturated group, as well as component (E) to addition reaction to cure the composition. The silicone rubber obtained by curing the thermally conductive polysiloxane composition can be used as a heat dissipation member for electronic devices and electronic parts, such as an integrated circuit element.

As a method for curing the thermally conductive polysiloxane composition, for example, there can be mentioned a method in which the composition is applied to an adherend which needs heat dissipation, and then the composition is allowed to stand at room temperature, and a method in which the above applied composition is heated at a temperature of 50 to 200° C. From the viewpoint of quickly curing the composition, a method in which the applied composition is heated is preferably employed.

With respect to the E hardness of a cured product of the thermally conductive polysiloxane composition, there is no particular limitation, but the E hardness is preferably 20 to 80. When the E hardness is in the above range, the cured product has flexibility such that the adhesion of the cured product to an electronic part is increased, so that stresses in the cured product from the outside can be appropriately relaxed, making it possible to increase the thermal conduction efficiency. The E hardness is preferably 30 to 70, more preferably 35 to 65.

With respect to the cured product of the thermally conductive polysiloxane composition, a change of the E hardness of the cured product after subjected to heat test at 150° C. for 1,000 hours is an index which indicates the stability of the cured product with time. When the change of the E hardness is too large, it is likely that the flexibility of the cured product and the adhesion of the cured product to an electronic part are changed with time, leading to a change of the thermal conductivity of the cured product. The change of the E hardness is preferably 20 or less, more preferably 16 or less, especially preferably 12 or less.

The cured product of the thermally conductive polysiloxane composition has a thermal conductivity at 23° C. of 2.0 W/(m·K) or more, preferably 2.5 W/(m·K) or more, more preferably 3.0 W/(m·K) or more, as measured by a hot wire method. For controlling the thermal conductivity of the cured product to improve the heat dissipation effect, the content of component (A) in the composition is preferably 80% by mass or more, and the content of component (A) can be increased according to the required thermal conductivity.

The silicone rubber obtained by curing the thermally conductive polysiloxane composition can be used as a heat dissipation member for, for example, a PC/server having mounted a CPU which generates a large amount of heat, electronic devices having mounted a power module, a very large scale integrated circuit (VLSI), or optical parts (such as an optical pickup and an LED), household appliances (for example, AV (audio-visual) machines, such as a DVD/HDD recorder and player, and an FPD), PC peripheral devices, home game machines, automobiles, and industrial devices, such as an inverter and a switching power source.

EXAMPLES

<Components Used>
Component (A)
Component (A-1): Alumina particles; average particle diameter: 35 μm
Component (A-2): Alumina particles; average particle diameter: 3 μm
Component (A-3): Alumina particles; average particle diameter: 0.4 μm
Component (B)
Cyclic siloxane compound:

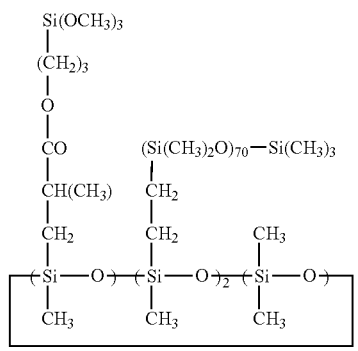

Component (C)
Component (C-1): n-Hexyltrimethoxysilane
Component (C-2): n-Decyltriethoxysilane
Component (D)
Polydimethylsiloxane having vinyl groups at both ends (viscosity: 100 mPa·s)
Component (E)
Component (E-1): Polyorganohydrogensiloxane $M^H D_{20} M^H$
Component (E-2): Polyorganohydrogensiloxane $M^H_k Q$ (comprising $M^H$ units and Q unit(s), and containing at least three or more hydrogen atoms bonded to silicon atoms per molecule; content of hydrogen atoms bonded to silicon atoms: 1.0% by mass; number average molecular weight in term of polystyrene: 800)
Component (F)
Platinum-based catalyst: Vinyltetramer complex; platinum content: 1.8% by mass
Component (F-2)
Reaction inhibitor: 1-Ethynyl-1-cyclohexanol
Component (G)
Silazane-treated fumed silica: Hexamethyldisilazane-treated fumed silica; BET specific surface area: 200 m²/g <Measurement Methods>
[Average Particle Diameter]
An average particle diameter (median diameter d50) was measured by a laser diffraction scattering method.

[Viscosity]
A viscosity of a thermally conductive polysiloxane composition was measured at 23° C. using a rotational viscometer rotor No. 7 at a rotational speed of 20 rpm for one minute in accordance with JIS K6249.

[Thixotropy Ratio]
A thixotropy ratio of a thermally conductive polysiloxane composition was determined. The thixotropy ratio is a value determined from the formula: $V_{10\ rpm}/V_{20\ rpm}$, wherein $V_{20\ rpm}$ is a viscosity of the thermally conductive polysiloxane composition at 23° C., as measured at a rotational speed of 20 rpm, and $V_{10\ rpm}$ is a viscosity of the thermally conductive polysiloxane composition at 23° C., as measured at a rotational speed of 10 rpm using the same rotor as used in the measurement at a rotational speed of 20 rpm.

[Slump Test]

An evaluation for slump was made by a slump vertical test in accordance with JIS A 1439. The test was conducted in an environment at 23° C. A channel container which is substantially the same as the channel container in JIS A 1439, except that the width was changed to 5 mm and the depth was changed to 5 mm, was filled with a thermally conductive polysiloxane composition. The resultant test specimen was vertically suspended, and after 30 minutes a distance between the lowermost end of the channel portion of the channel container and the tip of the sagging composition was measured in a unit of 0.5 mm. When the composition flowed out of the measurable range from the channel container, the composition was judged to have a slump.

[Thermal Conductivity of a Cured Product of a Composition]

With respect to a cured product of a thermally conductive polysiloxane composition, a thermal conductivity was measured at 23° C. in accordance with a Hot disk method using a Hot disk method thermophysical properties measurement apparatus (TPS 1500, manufactured by Kyoto Electronics Manufacturing Co., Ltd.).

[E Hardness of a Cured Product of a Composition]

With respect to a cured product of a thermally conductive polysiloxane composition, an E hardness was measured at 23° C. in accordance with JIS K 6253-3.

[E Hardness of a Cured Product after Subjected to Heat Test at 150° C. for 1,000 Hours]

A cured product of a thermally conductive polysiloxane composition was subjected to heat test at 150° C. for 1,000 hours. With respect to the thus obtained test specimen, an E hardness was measured at 23° C. in accordance with JIS K 6253-3.

Examples 1 to 4 and Comparative Examples 1 to 4

Components (A) to (D) and optional component (G) shown in Table 1 were charged into a planetary mixer (manufactured by Dalton Corporation), and mixed together and stirred at room temperature for one hour, and further stirred at 150° C. for 2 hours to obtain a mixture, followed by cooling to 25° C. Then, components (E), (F), and (F-2) were added to and mixed into the resultant mixture to obtain a thermally conductive polysiloxane composition. With respect to the obtained composition, a viscosity and a thixotropy ratio were measured, and a slump test was conducted. The results are shown in Table 1.

The thermally conductive polysiloxane compositions in Examples 1 to 4 and Comparative Examples 1 to 4 were individually cured in a mold by heating at 150° C. for one hour to obtain a cured product of the thermally conductive polysiloxane composition having a thickness of 6 mm. With respect to the obtained cured product, a thermal conductivity and an E hardness were measured. The results are shown in Table 1.

The above-obtained cured products of the thermally conductive polysiloxane compositions in Examples 1 to 4 and Comparative Examples 1 to 4 were individually subjected to heat test at 150° C. for 1,000 hours, and then an E hardness of the resultant cured product was measured. The results are shown in Table 1.

TABLE 1

| | Raw material | Example 1 | Example 2 | Example 3 | Example 4 | Comparative Example 1 | Comparative Example 2 | Comparative Example 3 | Comparative Example 4 |
|---|---|---|---|---|---|---|---|---|---|
| (A-1) | Alumina particles (Average particle diameter: 35 μm) | 1200 | 1200 | 1200 | 1200 | 1200 | 1200 | 1200 | 1200 |
| (A-2) | Alumina particles (Average particle diameter: 3 μm) | 400 | 400 | 400 | 400 | 400 | 400 | 400 | 400 |
| (A-3) | Alumina particles (Average particle diameter: 0.4 μm) | 400 | 400 | 400 | 400 | 400 | 400 | 400 | 400 |
| (B) | Cyclic siloxane compound | 30.8 | 35.2 | 33 | 33 | 44 | 44 | 44 | |
| (C-1) | n-Hexyltrimethoxysilane | 13.2 | 8.8 | | | | | | |
| (C-2) | n-Decyltriethoxysilane | | | 11 | 11 | | | | 44 |
| (D) | Polydimethylsiloxane having vinyl groups at both ends (Viscosity: 100 mPa · s) | 100 | 100 | 100 | 100 | 100 | 100 | 100 | 100 |
| (E-1) | Polyorganohydragensiloxane: $M^H D_{20} M^H$ | 17 | 17 | 17 | 17 | 17 | 17 | 17 | 17 |
| (E-2) | Polyorganohydragensiloxane: $M^H_4 Q$ | 0.54 | 0.54 | 0.54 | 0.54 | 0.54 | 0.54 | 0.54 | 0.54 |
| (F) | Platinum-based catalyst (Platinum content: 1.8% by mass) | 0.2 | 0.2 | 0.2 | 0.2 | 0.2 | 0.2 | 0.2 | 0.2 |
| (F-2) | 1-Ethynyl-1-cyclohexanol | 0.4 | 0.4 | 0.4 | 0.4 | 0.4 | 0.4 | 0.4 | 0.4 |
| (G) | Silazane-treated fumed silica | | | | 2 | | 4 | 6 | |
| | Number of hydrogen directly bonded to silicon in (E)/Number of vinyl group(s) in (D) (H/Vi ratio) | 0.75 | 0.75 | 0.75 | 0.75 | 0.75 | 0.75 | 0.75 | 0.75 |
| | Viscosity [Pa · s] | 256 | 248 | 260 | 280 | 150 | 252 | 364 | 212 |
| | Thixotropy ratio | 1.56 | 1.48 | 1.50 | 1.55 | 1.13 | 1.32 | 1.38 | 1.51 |
| | Slump test (5 mm) [mm] | 0 | 0 | 0 | 0 | Slump | Slump | Slump | 0 |
| | Thermal conductivity [W/(m · K)] | 4.25 | 4.23 | 4.26 | 4.22 | 4.20 | 4.10 | 4.05 | 4.24 |
| | E Hardness | 45 | 45 | 45 | 48 | 45 | 46 | 48 | 46 |

| Raw material | Example 1 | Example 2 | Example 3 | Example 4 | Comparative Example 1 | Comparative Example 2 | Comparative Example 3 | Comparative Example 4 |
|---|---|---|---|---|---|---|---|---|
| E Hardness after heat test, at 150° C. for 1,000 hours | 60 | 56 | 60 | 62 | 52 | 51 | 55 | 86 |
| Change of E hardness | 15 | 11 | 15 | 16 | 7 | 5 | 7 | 40 |

From a comparison of Examples 1 to 4 with Comparative Examples 1 to 4, it is apparent that the compositions in Examples 1 to 4, each comprising (A) a thermally conductive filler, (B) a siloxane compound represented by the general formula (1), (C) an alkoxysilane compound represented by the general formula (3), (D) a polyorganosiloxane containing at least one aliphatic unsaturated group per molecule, (E) a polyorganohydrogensiloxane having two or more hydrogen atoms bonded to silicon atoms per molecule, and (F) a platinum-based catalyst, are advantageous not only in that the composition has a low viscosity and hence exhibits excellent application properties, and further a slump of the composition after being applied does not occur, but also in that the cured product of the composition has a small change of the hardness with time. With respect to the compositions in Comparative Examples 1 to 3, which do not contain component (C), a slump of the composition after being applied occurs. With respect to the composition in Comparative Example 4, which does not contain component (B), the cured product of the composition has a large change of the hardness with time.

Each of the compositions in Examples 1 to 3, in which an alkoxysilane compound having a linear alkyl group with 6 to 10 carbon atoms is used as component (C), is advantageous not only in that the composition has a low viscosity, and further a slump of the composition after being applied does not occur, but also in that the cured product of the composition has a small change of the hardness with time. A comparison of Examples 1 to 3 shows that the cured product of the composition in Example 2, in which the blending ratio of component (B) and component (C), in terms of a mass ratio, is 80:20, advantageously has a smaller change of the hardness with time. The composition in Example 4, which contains components (A) to (F) and further (G) fumed silica chemically treated with a silazane compound, has a high thixotropy ratio, as compared to the composition in Example 3 which does not contain component (G).

INDUSTRIAL APPLICABILITY

The thermally conductive polysiloxane composition of the present invention can be used as a heat dissipation material for various devices having a portion that generates heat, for example, electronic devices, such as a personal computer.

The invention claimed is:

1. A thermally conductive polysiloxane composition comprising:
   (A) a thermally conductive filler;
   (B) a siloxane compound represented by the following general formula (1):

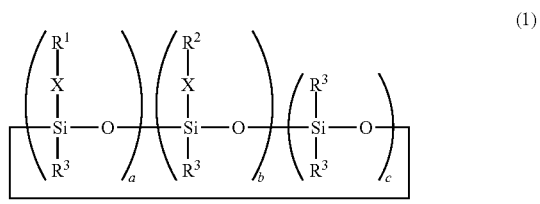

wherein:
$R^1$ is a group having one of the following structures:

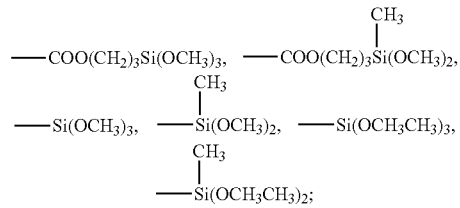

$R^2$ is a group having a siloxane unit represented by the following general formula (2):

wherein each $R^4$ is a methyl group, Y is a methyl group or a vinyl group, and d is an integer of 10 to 200;
each X is independently —CH$_2$CH$_2$— or —CH$_2$CH(CH$_3$)—;
each of a and b is independently an integer of 1 or more;
c is an integer of 1 or more;
a+b+c is an integer of 4; and
each $R^3$ is a methyl group;
(C) an alkoxysilane compound represented by the following general formula (3):

wherein $R^{11}$ is an alkyl group having 6 to 14 carbon atoms, $R^{12}$ is an unsubstituted or substituted acyclic monovalent hydrocarbon group having 1 to 5 carbon atoms, or an unsubstituted or substituted aryl group, each $R^{13}$ is independently an alkyl group having 1 or 2 carbon atoms, e is an integer of 1, f is an integer of 0 or 1, and e+f is an integer of 1 or 2;
(D) a polyorganosiloxane containing at least one aliphatic unsaturated group per molecule;
(E) a polyorganohydrogensiloxane having two or more hydrogen atoms bonded to silicon atoms per molecule; and (F) a platinum-based catalyst,
wherein a blending amount of component (B) is in a range of from 0.2 to 10 parts by mass, relative to 100 parts by mass of component (A),
wherein a blending amount of component (C) is in a range of from 0.1 to 5 parts by mass, relative to 100 parts by mass of component (A), and
wherein the blending ratio of the component (B) and the component (C), in terms of a mass ratio, is in a range of from 80:20 to 70:30.

2. The thermally conductive polysiloxane composition according to claim 1, wherein the component (A) comprises 20 to 70% by mass of (A-1) inorganic particles having an average particle diameter of 30 to 150 μm, 1 to 50% by mass of (A-2) inorganic particles having an average particle diameter of 1 to less than 30 μm, and 1 to 50% by mass of (A-3) inorganic particles having an average particle diameter of 0.1 to less than 1 μm.

3. The thermally conductive polysiloxane composition according to claim 1, further comprising (G) fumed silica chemically treated with a silazane compound, wherein the blending amount of the component (G) is 0.1 to 10 parts by mass, relative to 100 parts by mass of the component (D).

4. A silicone rubber which is obtained by curing the thermally conductive polysiloxane composition according to claim 1.

5. An electronic part comprising the silicone rubber according to claim 4.

6. The thermally conductive polysiloxane composition according to claim 2, further comprising (G) fumed silica chemically treated with a silazane compound, wherein the blending amount of the component (G) is 0.1 to 10 parts by mass, relative to 100 parts by mass of the component (D).

7. A silicone rubber which is obtained by curing the thermally conductive polysiloxane composition according to claim 2.

8. An electronic part comprising the silicone rubber according to claim 7.

9. A silicone rubber which is obtained by curing the thermally conductive polysiloxane composition according to claim 3.

10. An electronic part comprising the silicone rubber according to claim 9.

11. The thermally conductive polysiloxane composition according to claim 1, wherein the blending amount of component (B) is in a range of from 1.54 to 10 parts by mass, relative to 100 parts by mass of component (A), and
wherein the blending amount of component (C) is in a range of from 0.44 to 5 parts by mass, relative to 100 parts by mass of component (A).

12. The thermally conductive polysiloxane composition according to claim 1, wherein the blending amount of component (C) is in a range of from 0.44 to 0.66 parts by mass, relative to 100 parts by mass of component (A).

13. The thermally conductive polysiloxane composition according to claim 1, wherein the blending amount of component (B) is in a range of from 1.54 to 1.76 parts by mass, relative to 100 parts by mass of component (A).

14. The thermally conductive polysiloxane composition according to claim 1, wherein the blending amount of component (B) is in a range of from 1.54 to 1.76 parts by mass, relative to 100 parts by mass of component (A), and
wherein the blending amount of component (C) is in a range of from 0.44 to 0.66 parts by mass, relative to 100 parts by mass of component (A).

15. The thermally conductive polysiloxane composition according to claim 1, wherein in the general formula (1), $R^1$ is a group having one of the following structures:

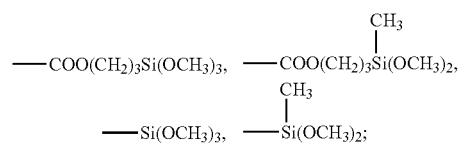

wherein in the general formula (1), Y is a methyl group, and d is an integer of 10 to 70; and
wherein in the general formula (3), $R^{11}$ is an alkyl group having 6 to 10 carbon atoms, and f is an integer of 0.

16. The thermally conductive polysiloxane composition according to claim 1, wherein in the general formula (1), $R^1$ is a group having one of the following structures:
—COO(CH$_3$)$_3$Si(OCH$_3$)$_3$,
—Si(OCH$_3$)$_3$.

17. The thermally conductive polysiloxane composition according to claim 1, wherein the component (B) is

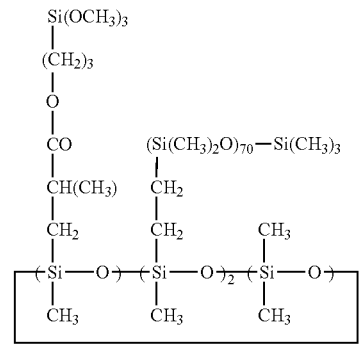

and the component (C) is n-Hexyltrimethoxysilane or n-Decyltriethoxysilane.

* * * * *